United States Patent [19]
Kimura et al.

[11] Patent Number: 5,355,629
[45] Date of Patent: Oct. 18, 1994

[54] DOOR STRUCTURE FOR VEHICLE

[75] Inventors: Koichi Kimura, Yokohama; Kenichi Hirooka, Ebina; Hiroshi Tsuchiya, Zama; Akito Tozuka, Fujisawa; Shuji Yamagata; Kiyoto Matsuzaki, both of Yokohama; Kensuke Uchida, Tokyo; Toshiaki Shiraiwa; Sumio Inami, both of Atsugi; Eiji Murakami, Sagamihara; Tetsuji Nasu, Yokohama; Takayuki Sano, Zama, all of Japan

[73] Assignee: Nissan Motor Company, Ltd., Yokohama, Japan

[21] Appl. No.: 996,971

[22] Filed: Dec. 23, 1992

[30] Foreign Application Priority Data

| Dec. 28, 1991 | [JP] | Japan | 3-359743 |
| Dec. 28, 1991 | [JP] | Japan | 3-359744 |
| Dec. 28, 1991 | [JP] | Japan | 3-359745 |
| Jan. 29, 1992 | [JP] | Japan | 4-013670 |

[51] Int. Cl.$^5$ ............................... B60J 5/04
[52] U.S. Cl. ............................... 49/502; 296/146.2
[58] Field of Search ............... 49/502, 503; 296/146.2, 296/201

[56] References Cited

U.S. PATENT DOCUMENTS

| 4,648,208 | 5/1987 | Baldamus et al. | |
| 4,662,115 | 5/1987 | Ohya et al. | |
| 4,785,585 | 11/1988 | Grier et al. | 49/502 |
| 4,794,735 | 1/1989 | Batchelder et al. | |
| 4,984,389 | 1/1991 | Benoit et al. | 49/502 |
| 5,033,236 | 7/1991 | Szerdahelyi et al. | |
| 5,048,234 | 9/1991 | Lau et al. | 49/502 |
| 5,050,350 | 9/1991 | Bertolini et al. | 49/502 |
| 5,056,264 | 10/1991 | Jewell, II et al. | 49/502 |

FOREIGN PATENT DOCUMENTS

| 0405159A1 | 5/1990 | European Pat. Off. |
| 59-34923 | 2/1984 | Japan |
| 61-125817 | 8/1986 | Japan |
| 63-60375 | 3/1988 | Japan |
| 3-96428 | 4/1991 | Japan |
| 2250534A | 11/1991 | United Kingdom |

OTHER PUBLICATIONS

Nissan Service Bulletin No. 578, P.D-30.

*Primary Examiner*—Philip C. Kannan
*Attorney, Agent, or Firm*—Lowe, Price, LeBlanc & Becker

[57] ABSTRACT

A door for a vehicle is assembled by joining three modules together to facilitate the assembly process. The three modules are an outer module including an outer panel, a window regulator module including a window pane and a window regulator, and an inner module including an interior member. The window regulator module is preliminarily assembled as an independent unit, so that it is easy to adjust the open and closed positions and the movement of the window pane. These modules are joined by fastening means extending along the direction of the thickness of the door, so that the assembly operation is made easier.

35 Claims, 13 Drawing Sheets

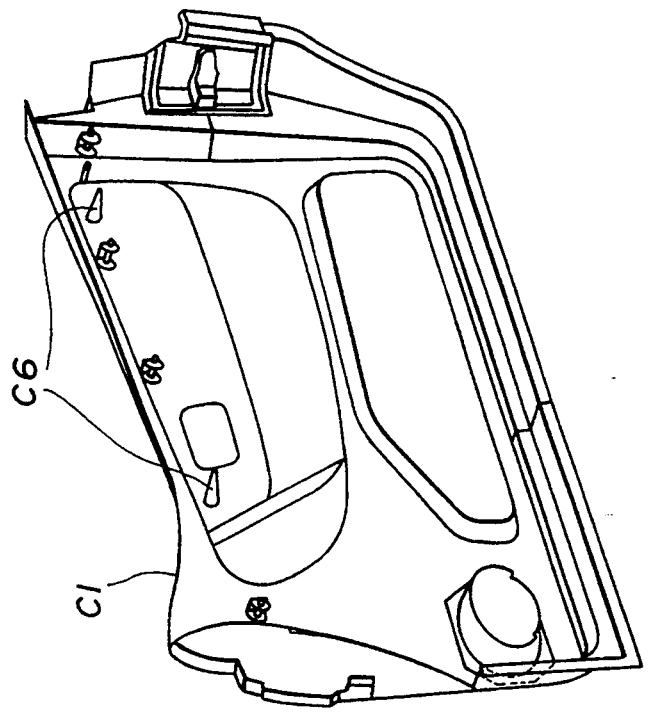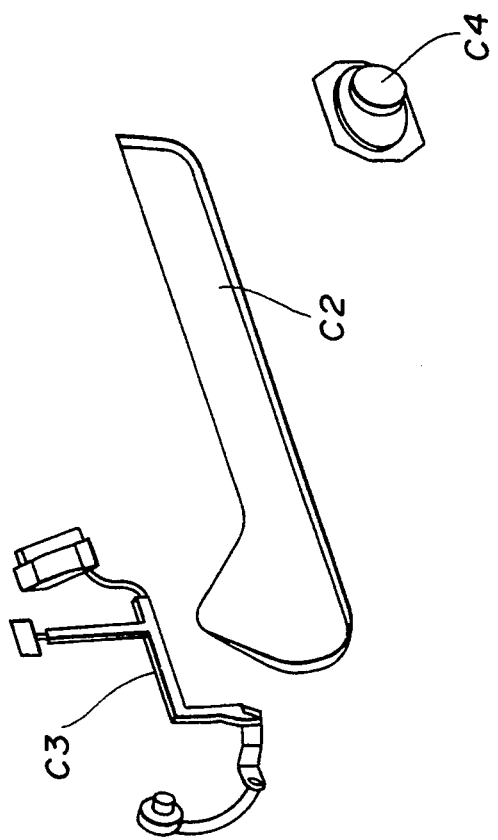
FIG.4

DOOR STRUCTURE FOR VEHICLE

BACKGROUND OF THE INVENTION

The present invention relates to a door structure for a vehicle.

In general, conventional vehicle doors have an assembled structure of outer and inner panels, a door window pane of glass, a window regulator, an interior trim member and other components. The inner panel is formed with access holes of various sizes large enough for screw fasteners or tools to be inserted for assemblage.

In such a conventional technique, the components are assembled in a predetermined sequence of steps, and with the progress of the assembly process, it becomes difficult or infeasible to tighten screw fasteners or perform other operations from the inside of the door. Therefore, more access holes are required and the operations becomes more difficult and troublesome.

In the conventional process in which components are assembled individually and independently, moreover, it is not possible to adjust the open and closed positions and movement of the window pane until almost all of the components have been assembled, and the adjustment of the window pane is difficult because consideration must be given to the positional error of each associated component which is independently attached. In the conventional technique, moreover, the adjustment of the window pane is performed on the basis of the geometry of the outer panel. Therefore, variation in shape and dimension of the outer panel tends to adversely affect the accuracy of adjustment of the window pane, necessitates corrective adjustment of the window pane, and complicates the assembly process.

In some conventional door structures, the interior trim member is fastened to the inner panel with a bolt inserted through a bolt hole formed in an arm rest of the interior member. This bolt joint structure restricts the freedom of design of the inner panel.

In another conventional example, a reinforcing member is fastened to front and rear ends of outer or inner panel with bolts extending in the fore and aft direction of the vehicle. This structure is disadvantageous in rigidity especially against torsional deformation of the door, and the tightening of the longitudinally extending bolts exerts an undesirable force tending to deform the longitudinally extending reinforcing member.

Some conventional vehicle door structures are disclosed in NISSAN service bulletin No. 578, page B-30, Japanese Utility Model Provisional Publication No. 61-125817, and Japanese Patent Provisional Publication No. 59-34923.

SUMMARY OF THE INVENTION

It is an object of the present invention to provide a vehicle door structure (or a vehicle having a door structure) which is easy to assemble, and advantageous in adjustment of a door window glass pane.

It is another object of the present invention to provide a vehicle door assembly (or a vehicle having a door) which is rigid in structure and light in weight.

According to the present invention, a vehicle's door structure (or a vehicle comprises a door which) comprises a first member which may comprise at least an inner panel, and a second member (such as a waist reinforcing member) joined to the first member by a joining means which extends substantially in parallel to an imaginary vertical plane which is perpendicular to a widthwise direction of the door and which is parallel to a direction of a thickness of the door.

The door structure of the vehicle may be an assembly of an outer module, a regulator module and an inner module. The outer module comprises the above-mentioned first member which is a basic structural member for providing a basic rigidity of the door, the regulator module comprises the above-mentioned second member, a window pane and a window regulator, and the inner module comprises an interior member. The joining means may comprises a first joining means, such as bolts, which joins the regulator module to the outer module, and which extends along the direction of the thickness of the door.

According to another aspect of the invention, a door structure comprises a U-shaped inner panel comprising first and second upright portions, a waist reinforcing member comprising first and second ends, and a joining means for joining the first end of the waist reinforcing member to the first upright portion of the inner panel at two or more first joint points which are distributed along the direction of the thickness of the door, and joining the second end of the waist reinforcing member to the second upright portion at two or more second joint points which are distributed along the direction of the thickness of the door.

BRIEF DESCRIPTION OF THE DRAWINGS

FIG. 4 is a view showing parts of the inner module.

DETAILED DESCRIPTION OF THE INVENTION

FIGS. 1–10 show a vehicle door (assembly) according to one embodiment of the present invention.

Figure 1:
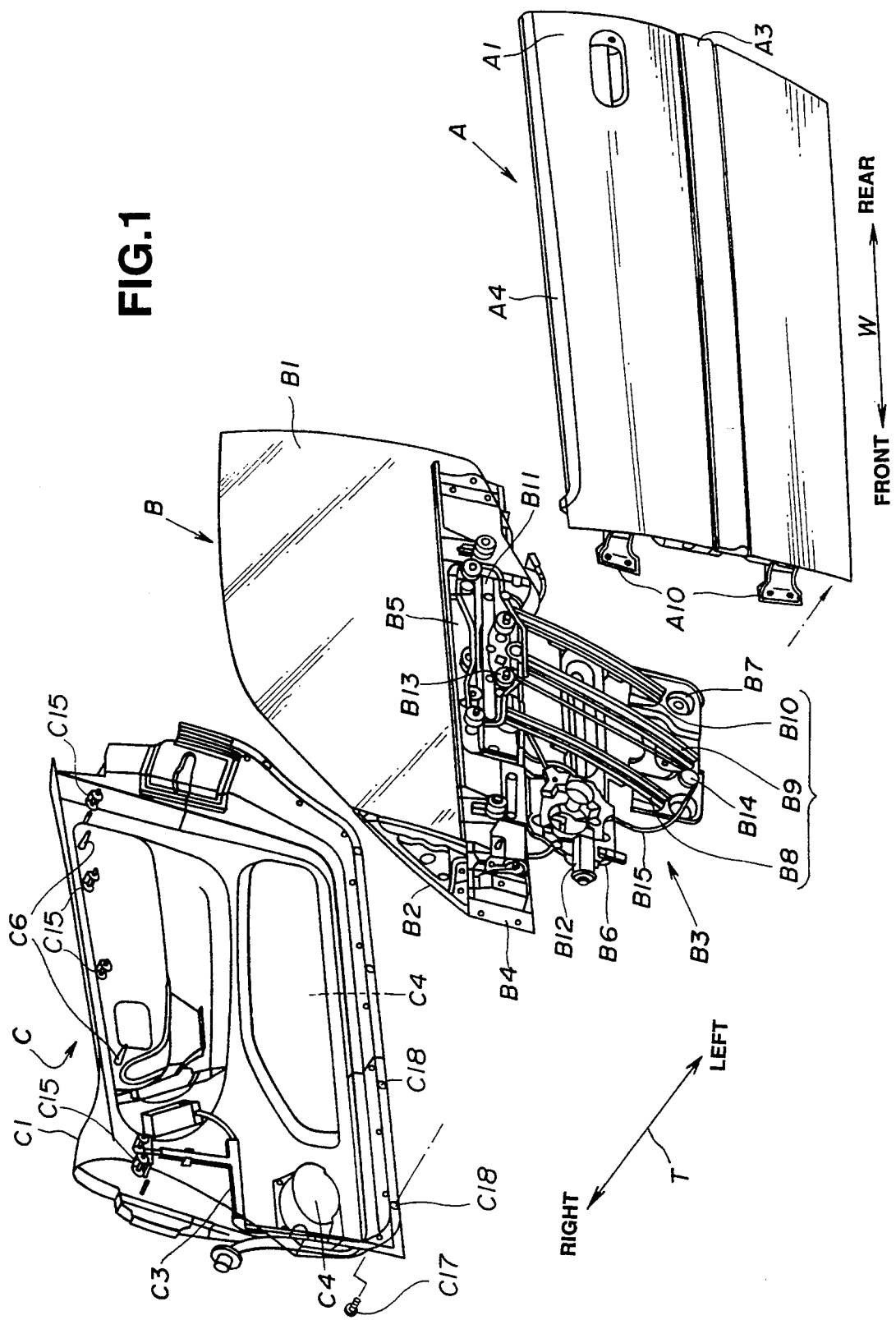
FIG. 1 is an assembly view showing an outer module, a regulator module and an inner module of a door structure according to one embodiment of the present invention.

The door comprises an outer module A, a regulator module B and an inner module C, as shown in FIG. 1. The door of this example is a sashless left front side door for a passenger car. In the figures, a W direction is a front and rear (or fore and aft) direction which is parallel to the vehicle body longitudinal (rolling) x axis of the vehicle when the side door is installed in the vehicle body, and held in the closed state. The W direction is the direction of the width of the side door. On the other hand, a T direction is a left and right (or in and out) direction which is parallel to the vehicle body lateral (pitching) y axis of the vehicle when the side door is in the closed state in the vehicle body. The T direction is the direction of the thickness of the side door.

Figure 5:
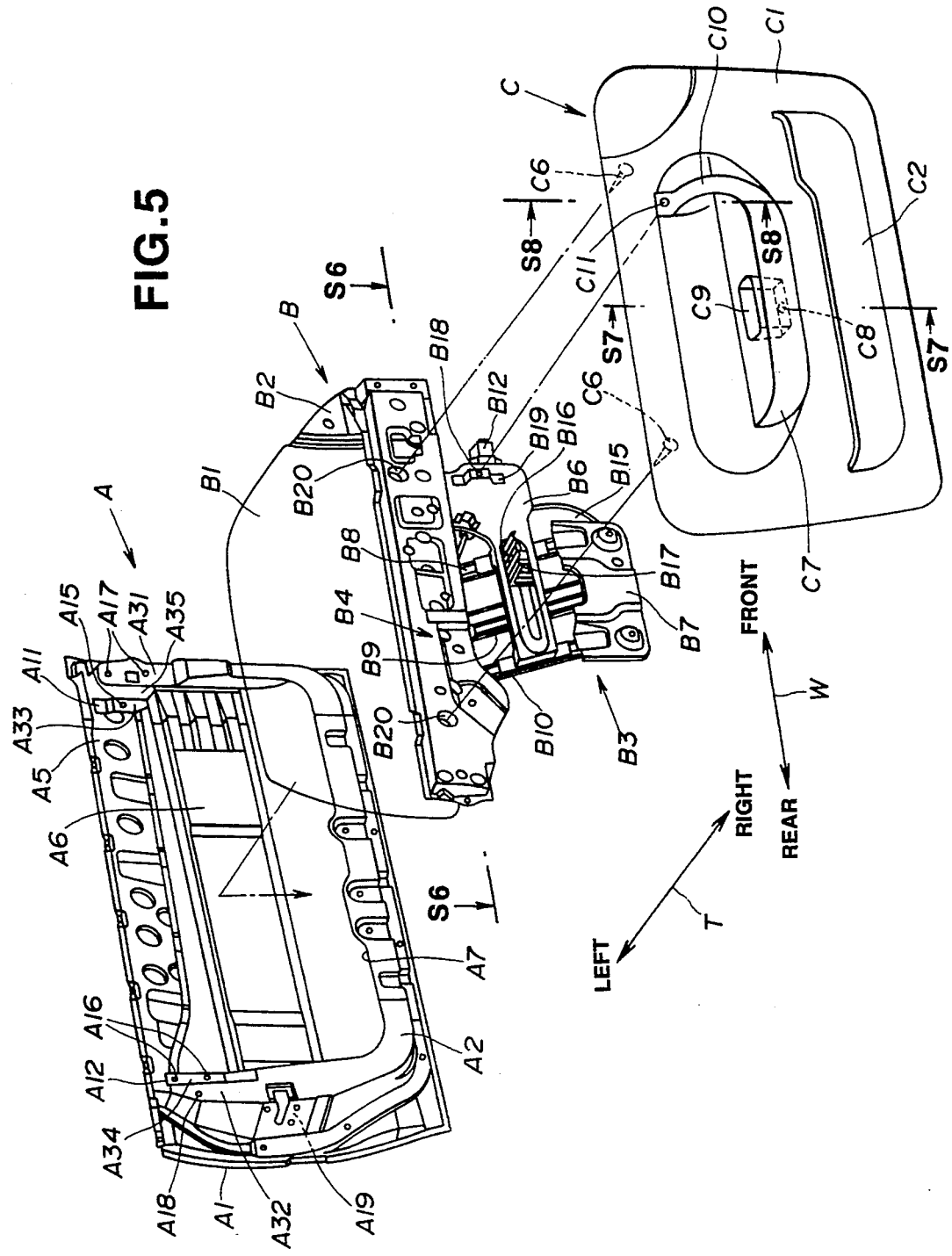
FIG. 5 is a view showing an assembly process of the door assembly of the embodiment, as viewed from the inboard side.

The outer module A comprises a basic structural member serving as a major support and giving basic strength and rigidity of the door. The basic structural member may be in the form of a frame of the door. In this example, the basic structural member comprises an outer panel A1 and an inner panel A2. (The basic structural member may consist only of the inner panel A2.) The outer panel A1 has an outside (or outboard) surface which is the outside surface of the door. Moldings A3 and A4 are attached to the outside surface and an upper edge of the outer panel A1, respectively. The outer module A further comprises a door outer waist reinforce A5 and a guard member A6 which are provided on the inboard (interior) side of the outer panel A1, as shown in FIG. 5, in order to increase the rigidity of the outer module A.

Figure 2:
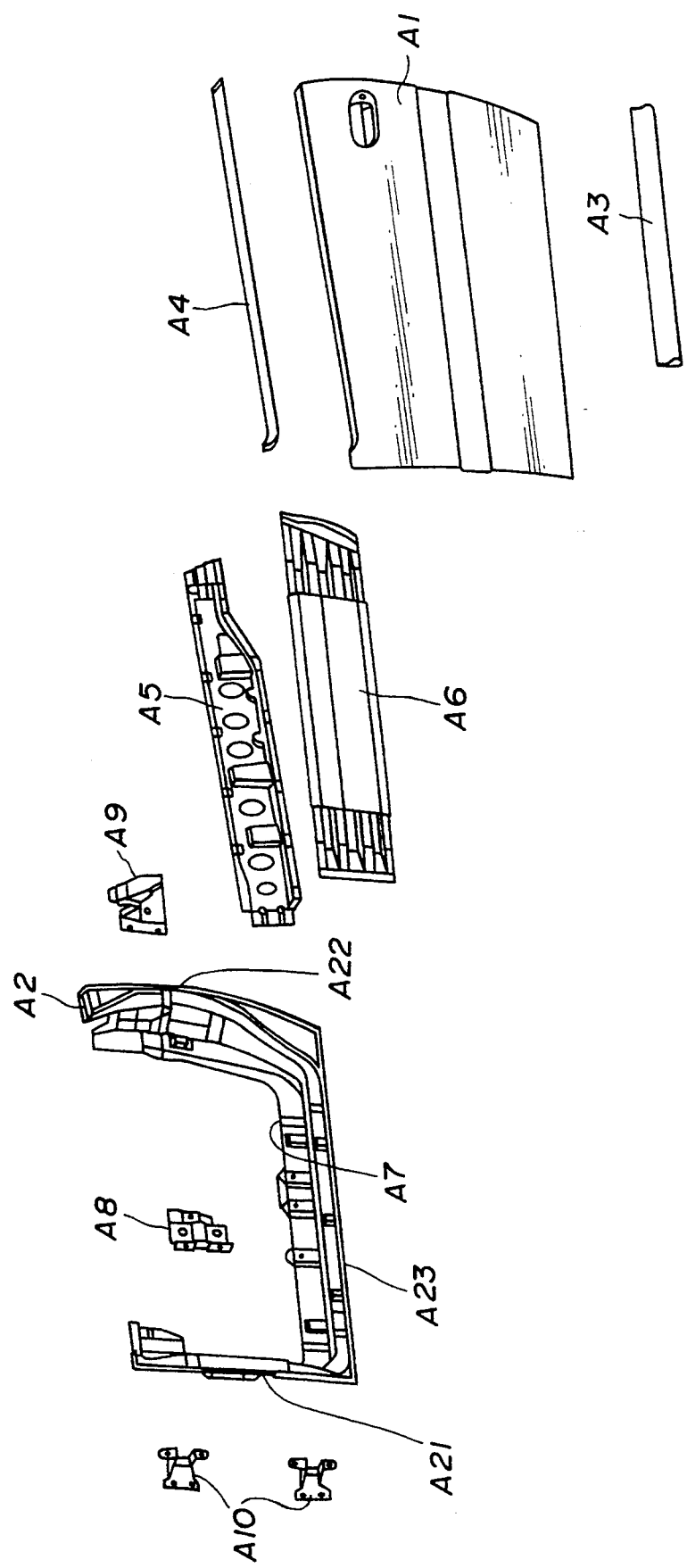
FIG. 2 is a view showing parts of the outer module.
Figure 6:
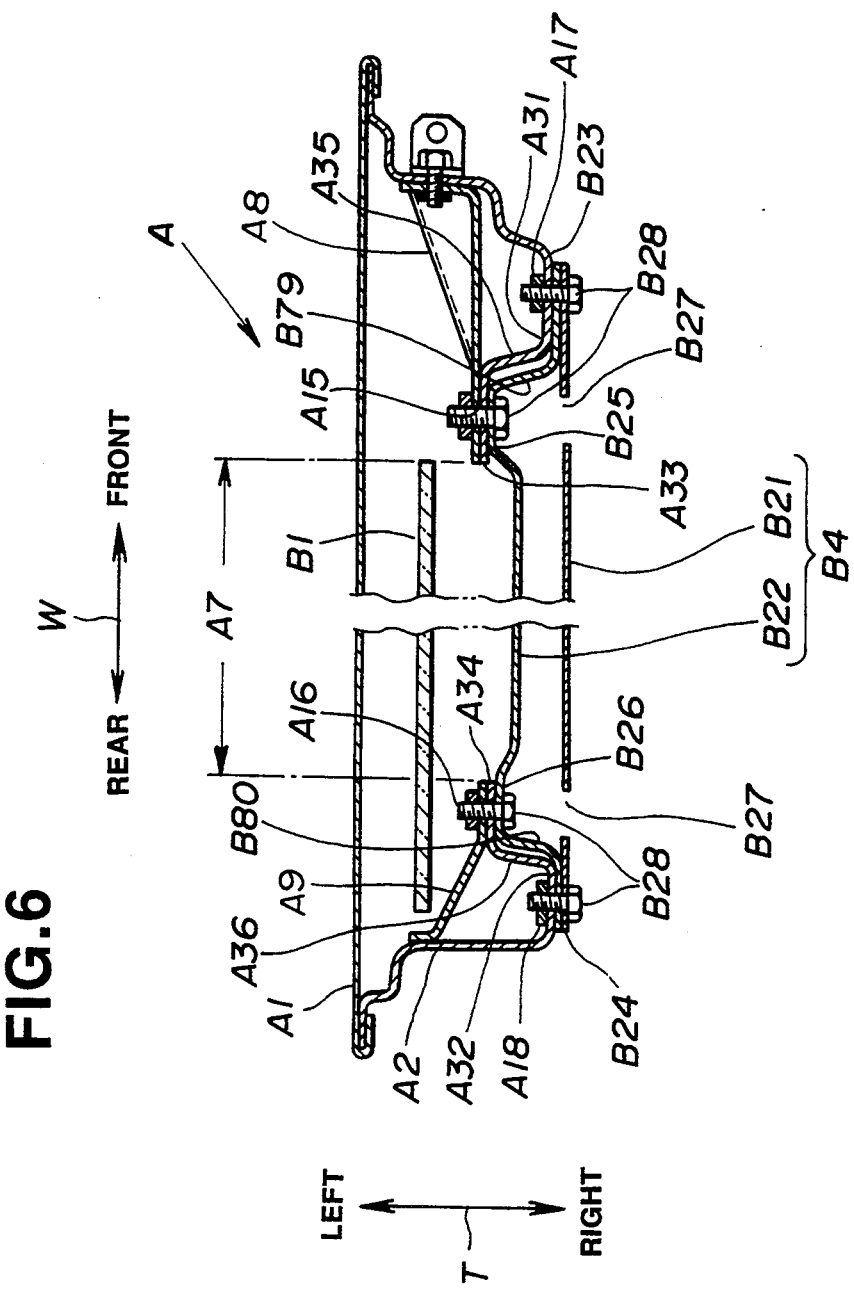
FIG. 6 is a sectional view taken along a line S6—S6 of FIG. 5, for showing the assembled state of the outer and regulator modules.
Figure 7:
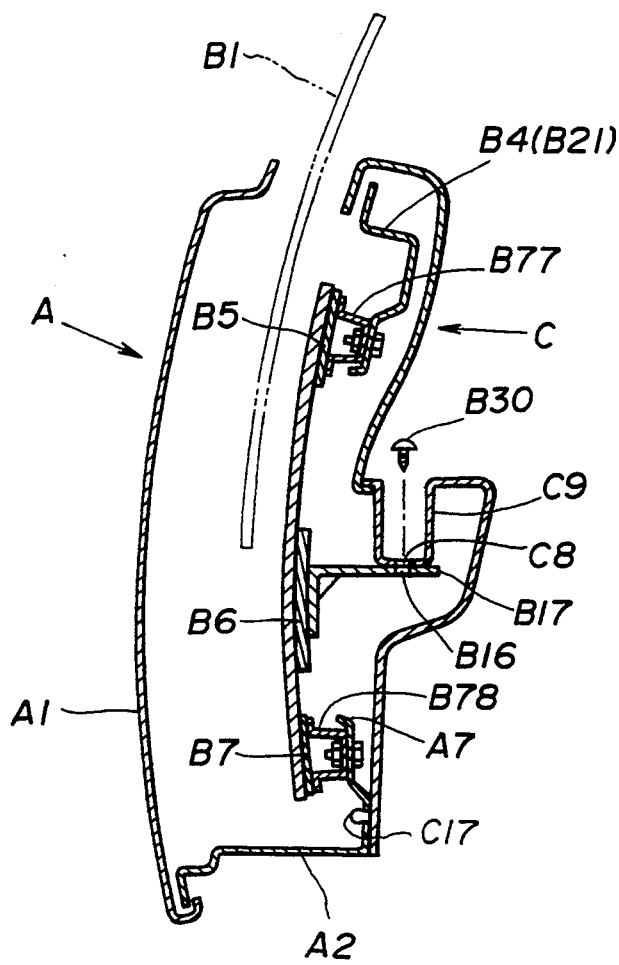
FIG. 7 is a sectional view taken along a line S7—S7 of FIG. 5, for showing the assembled state of the regulator and inner modules.
Figure 8:
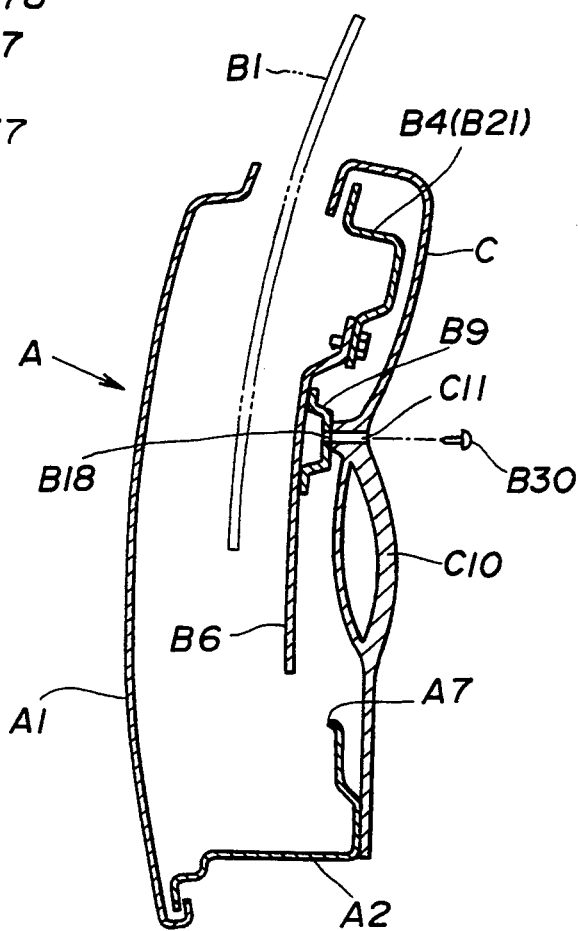
FIG. 8 is a sectional view taken along a line S8—S8 of FIG. 5, for showing the assembled state of the regulator and inner modules.

The inner panel A2 has a large opening (or cutout portion) A7 which is cut from the above, in this example. The inner panel A2 of this example, therefore, is U-shaped, as shown in FIG. 2, and has a lower portion A23 extending horizontally, and first and second upright portions A21 and A22 extending upwardly, respectively from first and second ends of the lower portion A23. The lower portion A23 extends along the front and rear W direction as shown in FIGS. 1, 5 and 6. In this example, the first upright portion A21 extends vertically from the front end of the lower portion A23. The second upright portion A22 extends vertically from the rear end of the lower portion A23. A front reinforcing bracket A8, and a brace A9 are fixed to the front and rear upright portions A21 and A22, respectively. Each of the reinforcing bracket A8 and the brace A9 is fixed to an L-shaped portion of the front or rear upright portions A21 or A22. The L-shaped portion of each upright portion A21 or A22 is an angled portion bent toward the inboard side. Upper and lower hinge units A10 are fixed to the front side of the front upright portion A21 of the inner panel A2, for supporting the door assembly on the vehicle body so that the door assembly can swing about a vertical axis. A lock portion A19 for locking and unlocking the door assembly is fixed to the rear upright portion A22 of the inner panel A2. The U-shaped inner panel A2 and at least one of the door outer waist reinforce A5 and the guard member A6 constitute a basic frame of the door.

The regulator module B comprises a door window pane of glass B1, a corner piece B2, a regulator subassembly B3, and a door inner waist reinforce B4. The regulator subassembly B3 comprises a basic lattice structure consisting of a set of upper, middle and lower brackets B5, B6 and B7 which extend along the front and rear W direction, respectively, at upper, middle and lower heights, and a set of front, middle and rear vertical rails B8, B9 and B10 which extend vertically, respectively at front, middle and rear positions arranged along the front and rear W direction. A carrier plate B11 is mounted on the rails B8, B9 and B10 so that the carrier plate B11 is slidable up and down along the rails.

The window pane B1 has a lower end portion which is fixed to the carrier plate B11, and is movable up and down together with the carrier plate B11. The regulator subassembly B3 further comprise a drive unit B12 fixed to the front end of the middle bracket B6, a pair of upper and lower pulleys B13 and B14, and a wire B15 which extends through the drive unit B12 and the upper and lower pulleys B13 and B14, and which has a portion fixed to the carrier plate B11. The wire B15 can transmit motion from the drive unit B12 to the carrier plate B11, and therefore, the drive unit B12 can cause the carrier plate B11 to move up and down together with the window pane B1. As shown in FIG. 5, a L-shaped bracket B17 and a U-shaped bracket B19 are fixed to the inner side of the middle bracket B6. The L-shaped bracket B17 is located approximately at the middle between the front and rear ends of the longitudinally extending middle bracket B6, and the U-shaped bracket B19 is located near the front end of the middle bracket B6. The L-shaped bracket B17 has a vertical portion fixed to the inner surface of the middle bracket B6, and a horizontal portion which extends inwardly from the upper end of the vertical portion, and which has a tapped hole B16 formed centrally in the horizontal portion. The U-shaped bracket B19 has upper and lower flanges fixed to the inner surface of the middle bracket B6, and a raised middle portion which extends between the upper and lower flanges, and which is formed with a tapped hole B18. The tapped hole B18 extends along the left and right T direction. The door inner waist reinforce B4 has an inside surface which is formed with front and rear locating holes B20 for locating the inner module C. The middle bracket B6 is L-shaped, and has a vertically extending portion whose top end is joined to the inner reinforce B4.

It is optional to fix the drive unit B12 to the rear side of the middle bracket B6. In this case, the rearward drive unit B12 increases the moment of inertia of the door, and contributes to the characteristic of closing operation of the door.

The inner module C comprises an interior trim member C1, a pocket member C2, and an opening and closing operation mechanism C3. The inner module C of this example further comprises a speaker C4 of an onboard audio system, and a grip cap C5, which are both fixed to the trim member C1. The trim member C1 has front and rear locating pins C6 projecting outwardly from the upper portion of the outside surface of the trim member C1. The locating pins C6 extend along the T direction toward the outside surface of the door, and are spaced apart along the W direction. An arm rest C7 of the inner module has a depression C9 for a pull handle. In the bottom of the depression C9, there is formed a fastener hole C8. The arm rest C7 has a grip portion C10 whose upper end is formed with a fastener hole C11 extending along the T direction.

This door is assembled in the following manner. This assembly process comprises a first step of fixing the regulator module B to the outer module A, and a second step of fixing the inner module C to the regulator module B.

First, the regulator module B is fixed to the outer module A. This step is performed by utilizing the following offset mounting setup.

The upper end of each of the front and rear upright portions A21 and A22 of the inner panel A2 of the outer module A is stepped so as to form a front or rear stepped portion A11 or A12, as shown in FIG. 5. The front and rear stepped portion A11 and A12 are reinforced, respectively, by the reinforcing bracket A8 and the brace A9 which are fixed to the outside surface of the inner panel A2 by welding or other joining method, as shown in FIG. 6. The front stepped portions A11 of the front upright portion A21 has first (inboard) and second (outboard) lap joint portions A31 and A33 and a middle portion A35 extending between the first and second joint portions A31 and A33. The rear stepped portion A12 has first (inboard) and second (outboard) lap joint portions A32 and A34, and a middle portion A36 extending between the first and second joint portions A32 and A34. The front second joint portion A33 is formed with a fastener (bolt) hole A15, and the rear second joint portion A34 is formed with upper and lower fastener (bolt) holes A16, as shown in FIGS. 5 and 6. The front first joint portion A31 is formed with upper and lower fastener holes (or bolt holes) A17, and the rear first joint portion A32 is formed with a fastener hole A18, as shown in FIG. 6. As shown in FIG. 6, in the front or rear stepped portion A11 or A12 of each of the front and rear upright portion A22 and A23, the first and second joint portions A31 and A33 or A32 and A34 are relatively narrow, substantially flat, substantially vertical, substantially parallel to each other, and substantially perpendicular to the T direction. The second (outboard) joint portion A33 or A34 is closer to the outer panel A1, and the first (inboard) joint portion A31 or A32 is remoter from the outer panel A1. The upper and lower fastener holes A17 are spaced vertically, and the hole A15 is formed at an intermediate height between the upper and lower holes A17. Similarly, the fastener hole A18 is intermediate in height between the vertically spaced upper and lower holes A16. The front and rear first joint portions A31 and A32 are wider apart from each other along the W direction than the second joint portions A33 and A34, which are located along the W direction between the first joint portions A31 and A32. The first and second joint portions and the middle portion of each stepped portion are integral parts of a jointless single panel. The front middle portion A35 extends from the rear end of the first joint portion A31 to the front end of the second joint portion A33. The rear middle portion A35 extends from the rear end of the second joint portion A34 to the front end of the first joint portion A32.

Figure 3:
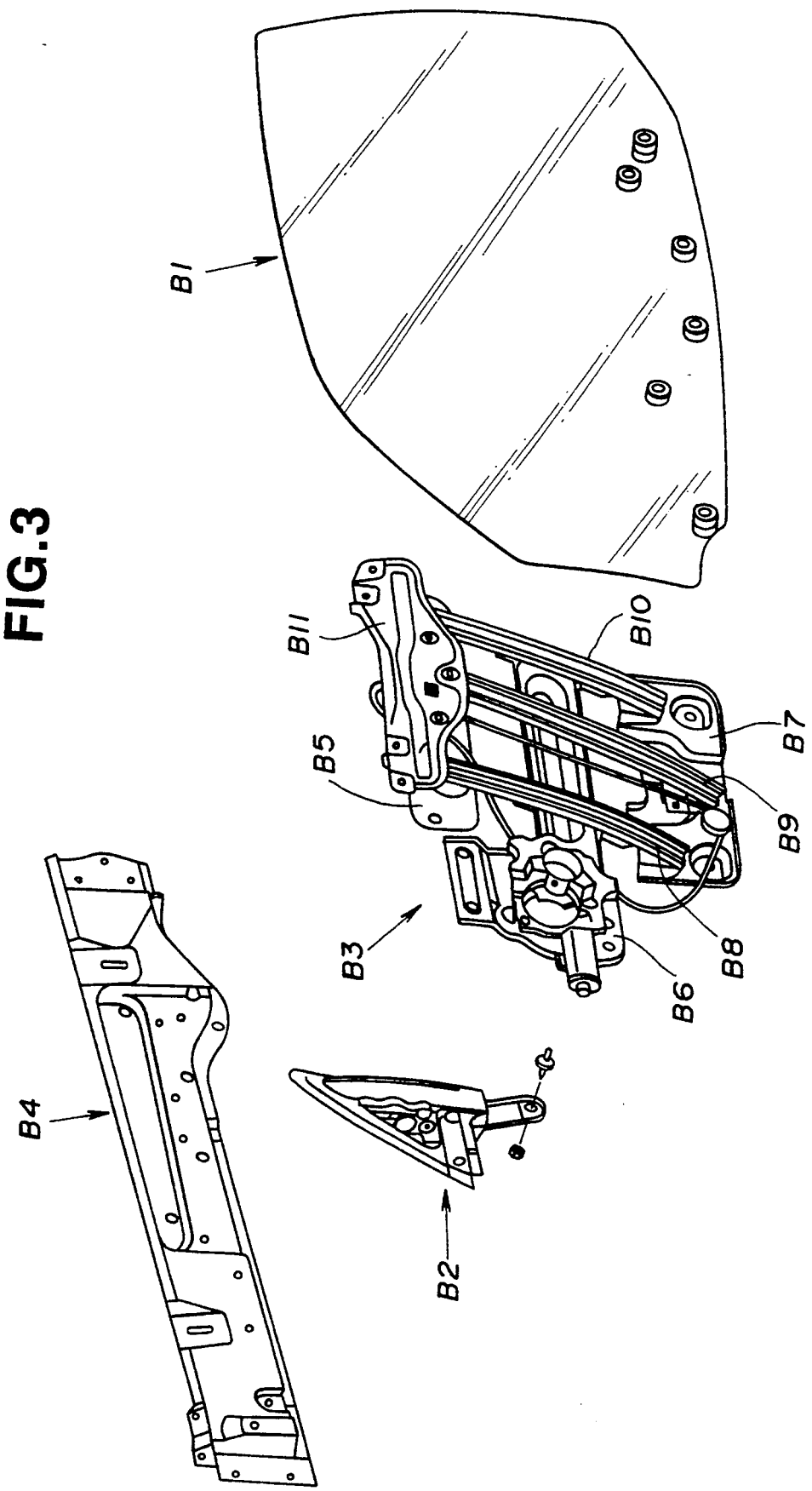
FIG. 3 is a view showing parts of the regulator module.

On the other hand, the front and rear ends of the inner reinforce B4 of the regulator module B are also stepped so as to fit to the stepped portions A11 and A12 of the inner panel A2, and formed with fastener (bolt) holes B23–B26 corresponding to the holes A15–A18 of the inner panel A2. The inner reinforce B4 of this example comprises inner and outer panels B21 and B22 which are joined together so as to form a hollow box beam (or hollow box girder). The box beam formed by the panels B21, and B22 has a generally rectangular cross section. The box beam may be shaped in various manners and may be formed with a groove (or a corrugation) to further increase the rigidity, so that the cross section is not necessarily an exact rectangle. The inner reinforce B4 has a front lap end at which the front ends of the first and second panels B21 and B22 are overlapped, and a second lap end at which the rear ends of the first and second panels B21 and B22 are overlapped. The front lap end of the inner reinforce B4 is formed with the upper and lower holes B23 corresponding to the upper and lower holes A17, and the rear lap end is formed with the hole B24 corresponding to the hole A18. Therefore, each of these holes B23 and B24 is formed in the first and second panels B21 and B22. The second panel 22 has a front offset portion which is formed with the hole B25 corresponding to the holes A15, and a rear offset portion which is formed with the upper and lower holes B26 corresponding the upper and lower holes A16. The first panel B21 is formed with access holes B27 corresponding to the holes B25 and B26. The second panel B22 further has a front intermediate portion B79 extending from the front offset portion to the front lap end, and a rear intermediate portion B80 extending from the rear offset portion to the rear lap end. The front intermediate portions A35 and B79 extend side by side substantially along the thickness direction T, and the front intermediate portions A35 and B79 are slightly spaced along the W direction so that it is possible to slightly shift the inner reinforce B4 along the W direction with respect to the inner panel A2. Similarly, the rear intermediate portions A36 and B80 extend substantially along the T direction, and are slightly spaced along the W direction when the regulator module B is correctly fastened to the outer module A. In this example, the intermediate portions A35, A36, B79 and B80 are not exactly parallel to the T direction, but slightly oblique as shown in FIG. 3. When an excessive force is applied in the W direction on the door assembly, the intermediate portion B79 or B80 abuts against the intermediate portion A35 or A36, and increases the rigidity along the W direction.

The thus-constructed inner reinforce B4 of the regulator module B is set to the front and rear upper ends of the inner panel A2 of the outer module A, and the holes A15–A18 and B23–B26 are positioned correctly. Thereafter, the regulator module B is joined to the outer module A by joining the inner reinforce B4 to the inner panel A2 by fastening means B28. In this example, the fastening means comprises bolts and mating nuts. In this example, all the nuts are preliminarily fixed to the inner panel A2 by welding or other joining process. As shown in FIG. 6, all of the bolts B28 extend along the T direction, and their heads are located on the inboard side. Therefore, it is possible to join the inner reinforce B4 to the inner panel A2 only from the inboard side. The access holes B27 of the first panel B21 make it possible to insert and tighten the bolts B28 into the holes B25 and B26 of the second panel B22 concealed by the first panel B21. The upper bracket B5 of the thus-assembled regulator module B is fastened through a mounting bracket B77 shown in FIG. 7, to a middle lower end portion of the first panel B21 of the inner reinforce B4. The lower bracket B7 is fastened through a mounting bracket B78 shown in FIG. 7, to a lower portion of the inner panel A2.

The outer and regulator modules A and B according to this embodiment of the present invention significantly make easier and faster the assembly step for joining the regulator module B to the outer module A because both modules are assembled together by the operations along the T direction only. Therefore, the automatization of the assembly process is easier. Furthermore, the assembly of the outer and regulator modules A and B improves the rigidity and accuracy of the assembly, and reduces the weight. First, the inner reinforce B4 in the form of a box beam increases the rigidity. Second, the reinforcing bracket A8 and the brace A9 form rigid closed hollow structures with the inner panel A2 at the rear and front ends of the inner reinforce A4. Furthermore, the inner reinforce B4 and the inner panel A2 are joined together with the offset structure of the stepped portions. The joining points (or the positions of the bolts and nuts B28) between the inner reinforce B4 and the inner panel A2 are distributed in a three-dimensional space, not only along the longitudinal W direction, and the vertical direction but along the door thickness T direction as well. This joining structure increases the positional accuracy of the inner reinforce B4 (and the window pane B1), and the rigidity of the door assembly. The diameter of each of the fastener holes A15–A18 and B23–B26 are slightly greater than the outside diameter of the shank of the corresponding bolt B28. This allowance enables minute and subtle adjustment of the position of the inner reinforce B4 relative to the inner panel A2 along the W direction and the vertical direction (two-dimensionally).

Next, the inner module C is fixed to the subassembly of the outer module A and the regulator module B by the following second step. The inner module C is set to the regulator module B by inserting the locating pins C6 of the inner module C into the locating holes B20 of the inner reinforce. The locating pins C6 and locating holes B20 all extends along the T direction. In this way, the inner module C is positioned easily and correctly relative to the regulator module B by the locating pins C6 fit in the locating holes B20. The locating pins C6 fit in the locating holes B20 make the inner module C immovable relative to the regulator module B in the W direction and the vertical direction. Thus, the inner module C is positioned by the locating pins C6, and fixed to the regulator module B by clip portions C15 (shown in FIG. 1) which are integrally formed in the outer side of the trim member C1 and which are inserted into holes formed in the regulator module B. Then, the inner module C is further fixed to the regulator module B by tightening a screw fastener B29 into the tapped hole C8 of the L-shaped bracket B17 in the depression C9 and a screw fastener B30 through the hole C11 of the grip portion C10 into the tapped hole B18 of the U-shaped bracket B19 fixed to the middle bracket B6. The screw fasteners B29 and B30 serve to increase the strength and rigidity of the arm portion C7 and the grip portion C10 which are manually pushed or pulled to operate the door or to use as an arm rest. In this way, the inner module C is fastened to the regulator module B. Then, the peripheral portions of the interior trim member C1 are fixed to the inner panel A2 and the inner reinforce B4, by means of clips C17 inserted in clip holes C18 (shown in FIG. 1) formed in the inner panel A2 and the inner reinforce B4.

In the thus-assembled door, the waist slot through which the window pane B1 projects upwardly is formed between the upper end of the outer panel A1 and the inner reinforce B4. In the door assembly according to this embodiment, it is possible to make this waist slot narrower as compared with the conventional door structure, and accordingly it is possible to increase the rigidity of the door assembly. In the door assembly of this example, door glass stabilizers for supporting the window pane B1 are eliminated in order to reduce the weight of the door assembly.

In this door structure, the door inner waist reinforcing member B4, the window pane B1 and the window regulator B3 are assembled into the independent regulator module B. The basic components for supporting and moving the window pane B1 are collected in the regulator module B. Therefore, it is possible to accurately adjust the position and movement of the window pane B1 within the regulator module B before joining the regulator module B to the outer module A. The thus-constructed regulator module B is a self-contained rigid subassembly which can be carried as a unit without affecting the adjustment of the well-fitted window pane B1.

The U-shaped inner panel A2 formed with the large opening A7 can reduce the total weight of the door assembly. The interior trim member C1 is fixed to the regulator module B. Therefore, the fixing of the interior member is easy, reliable and suitable for automatization of the assembly process.

Figure 9:
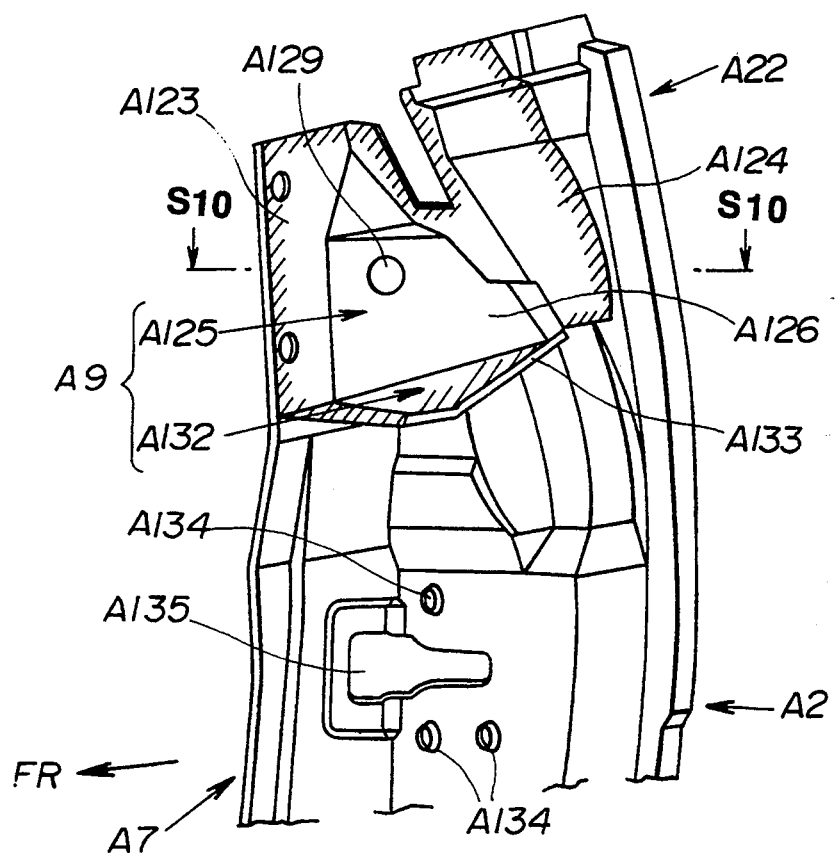
FIG. 9 is an enlarged view showing a brace fixed to the rear upper portion of the inner panel.
Figure 10:
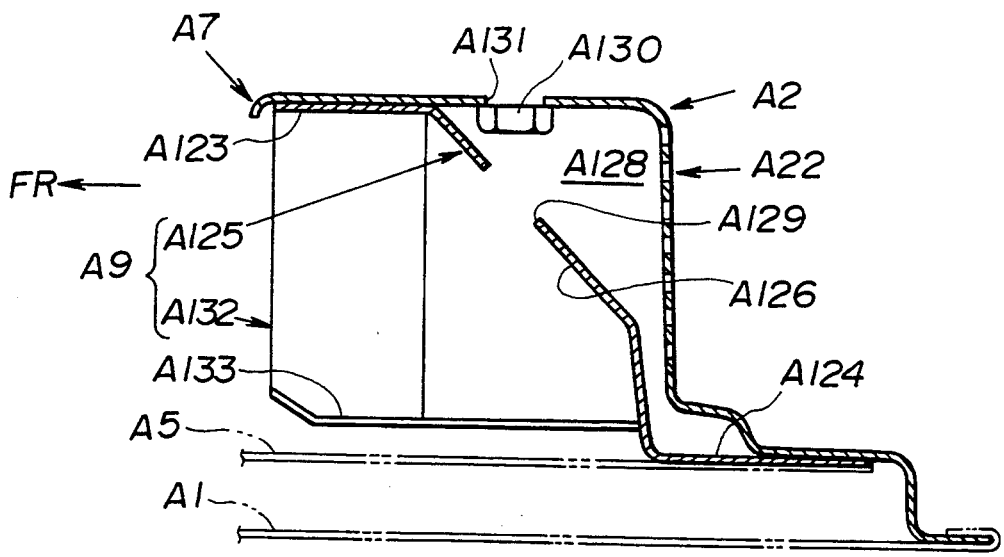
FIG. 10 is a sectional view taken along a line S10—S10 of FIG. 9.

FIGS. 9 and 10 show one example of the brace A9 which can be used in the door structure shown in FIGS. 1–8.

The brace A9 shown in FIGS. 9 and 10 has a vertical portion A125 which is generally vertical, and a horizontal portion A132 which is generally horizontal. The vertical portion A132 has a front end (first end) A123, a rear end (second end) A124 and a diagonal portion A126 extending between the front and rear ends A123 and A124. The front and rear ends A123 and A124 are joined, by welding for example, to the corner of the rear upright portion A22 of the inner panel A2. The upright portion A22 of the inner panel A2 is angled as shown in the sectional view of FIG. 10. The front end A123 is joined to one side of the apex of the angle of the upright portion A22, and the rear end A124 is joined to the other side. The diagonal portion A126 extends from one side to the other side of this angle of the upright portion A22, and forms a closed space A128 which is approximately shaped like a triangle. This space A128 is enclosed by the vertically extending walls of the brace A9 and the inner panel A2. In this example, the angle of the rear upright portion A22 is substantially a right angle, and the diagonal portion A126 extends so as to subtend the right angle like a hypotenuse. The door outer waist reinforce A5 extends in parallel to the outer panel A1. The rear end A124 of the brace A9 is sandwiched between the rear end of the door outer waist reinforce A5 and the inner panel A2, and they are joined together by welding, for example. In this example, the upper portion of the diagonal portion A126 is joined almost entirely to the rear upright portion A22 of the inner panel A2 so as to close the upper end of the space A128. The closed structure of the space A128 formed by the brace A9 significantly increases the rigidity of the rear upright portion A22 of the inner panel A2, and reinforces the frame of the inner panel A2 having the relatively large opening A7.

The diagonal portion A126 of the brace A9 is formed with a hole A129, and the rear upright portion A22 is formed with a fastener hole A131 with a weld nut A130. The door inner waist reinforce B4 is fixed to the rear upright portion A22 of the inner panel A2 by using the hole A129 and the weld nut A130.

The horizontal portion A132 of the brace A9 is formed by bending, and projects from the lower ends of the front end portion A123 and the diagonal portion A126. The horizontal portion A132 slightly slopes down toward the front FR. The horizontal portion A132 has a lowest flangeless edge and a flanged edge which is formed with an upward flange A133 extending along the outer panel A1.

This horizontal portion A132 serves as a reinforcing rib (stiffening rib) for the vertical portion A125, and further increases the rigidity of the brace A9 itself and the rigidity of the closed structure of the triangular space A128.

The brace A9 is located just above a door lock unit (not shown in FIG. 9) which is fastened to the rear upright portion A22 by lock holes A134 shown in FIG. 9. Therefore, the horizontal portion A132 shields the door lock unit, and improves the anti theft capability. The upright portion A22 is further formed with a hole A135 for receiving a striker (not shown).

Moreover, the horizontal portion A132 of the brace A9 protects the door lock unit against water coming from the waist portion of the door (near the molding A4 shown in FIG. 1). The horizontal portion A132 regulates the flow direction of the water with its sloping surface and the upward flange A133, and facilitates the drainage of water from a drain hole (not shown) formed in the bottom of the door. In this way, the horizontal portion A132 protects the door lock unit from freezing and other troubles due to water.

It is optional to employ a brace similar to the brace A9 in place of the reinforcing bracket A8 for the front upright portion A21.

FIGS. 11–14 show a vehicle door according to a second embodiment of the present invention. The door of the second embodiment is a sashed door.

The door of the second embodiment comprises an outer module 10, a regulator module 11 and an inner module (not shown) as in the door of the first embodiment.

The outer module 10 includes, as main components, an outer panel 12 and a U-shaped inner panel 13 as in the first embodiment. The outer module 10 of the second embodiment further includes a sash 15 for supporting a window pane. The sash 15 is an integral part of the outer module 10. The inner panel 13 is formed with a relatively large opening (or cutout portion) 16 which is cut from the upper side.

The inner panel 13 has first (front) and second (rear) waist portions W and W' which are separated from each other by the opening 16. The inner panel 13 is shaped to form ledges 17 and 18, respectively, in the waist portions W and W'. Each ledge 17 or 18 bulges toward the inboard side (or interior side), and extends along the widthwise direction of the door in the corresponding waist portion W or W'. Each ledge 17 or 18 has a top surface slightly sloping down toward the inboard side. Waist reinforcing brackets 19 and 20 are joined, from the outboard side (or exterior side), to the front and rear waist portions W and W', respectively.

The front waist bracket 19 of this example has an upper portion 21 serving as a corner piece, a middle bent portion 19a confronting the ledge 17 of the inner panel 13, and a lower portion extending downwards below the ledge 17. The middle bent portion 19a bulges toward the outboard side, and forms a first closed section 22 with the front ledge 17 of the inner panel 13. The closed section 22 has a cross sectional shape approximately similar to a parallelogram. The front waist bracket 19 further has an extended portion 23 which is an extension of the middle bent portion 19a extended horizontally to a limited extent toward the rear waist portion W'. The extended portion 23 has the same cross sectional shape as the bent portion 19a. The extended portion 23 is an integral part of the front waist bracket 19.

The rear waist bracket 20 extends from the height of the base portion of the sash 15, to a door lock unit 24, and has a bent portion 20a which forms a horizontally extending closed section 25 with the rear ledge 18 of the inner panel 13 in the same manner as the closed section 22 on the front side. The rear waist bracket 20 also has an extended portion 26 which projects horizontally to a limited extent toward the front waist portion W and has the same shape as the bent portion 20a.

Figure 11:
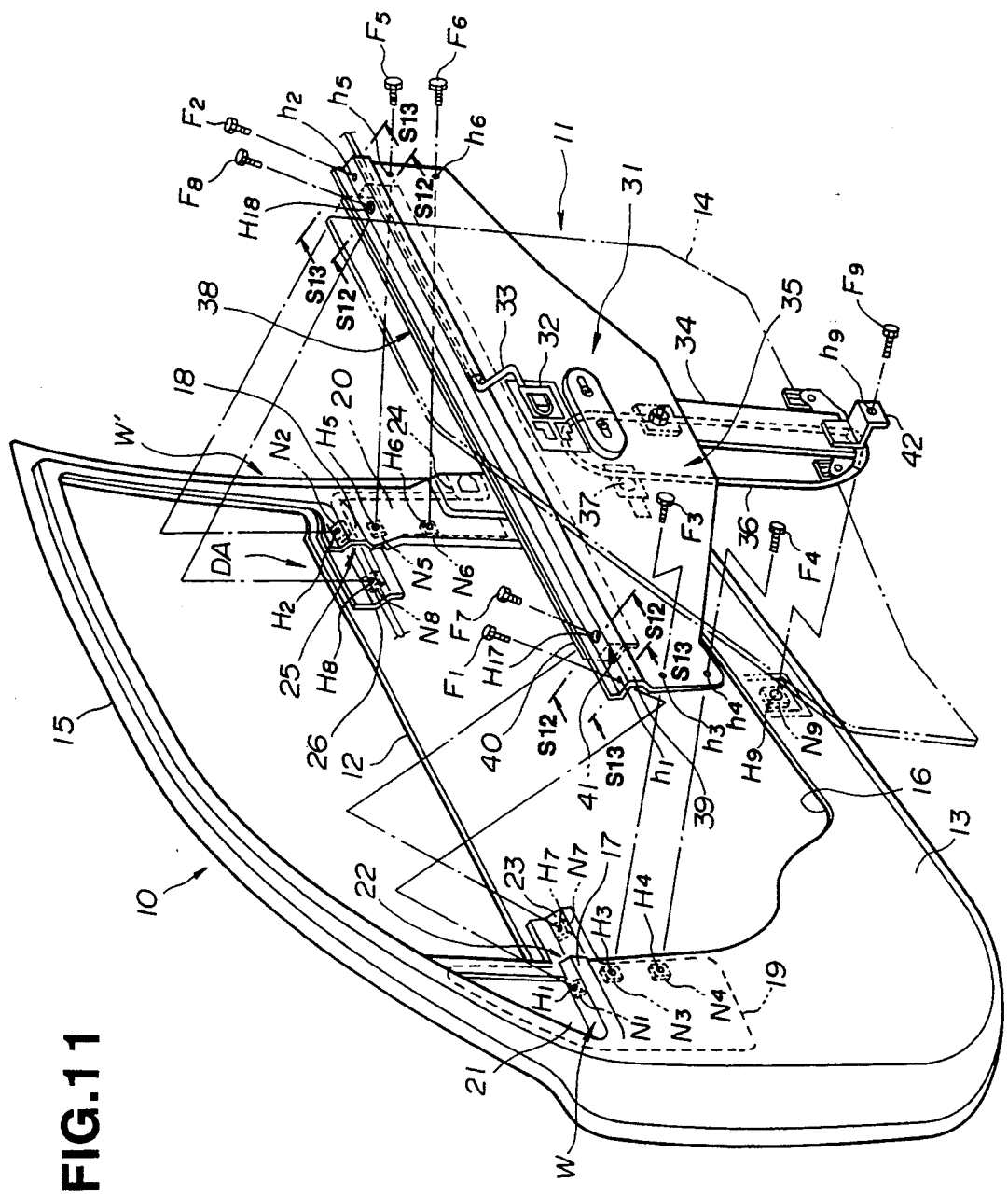
FIG. 11 is a view showing a door structure according to a second embodiment of the present invention.
Figure 14:
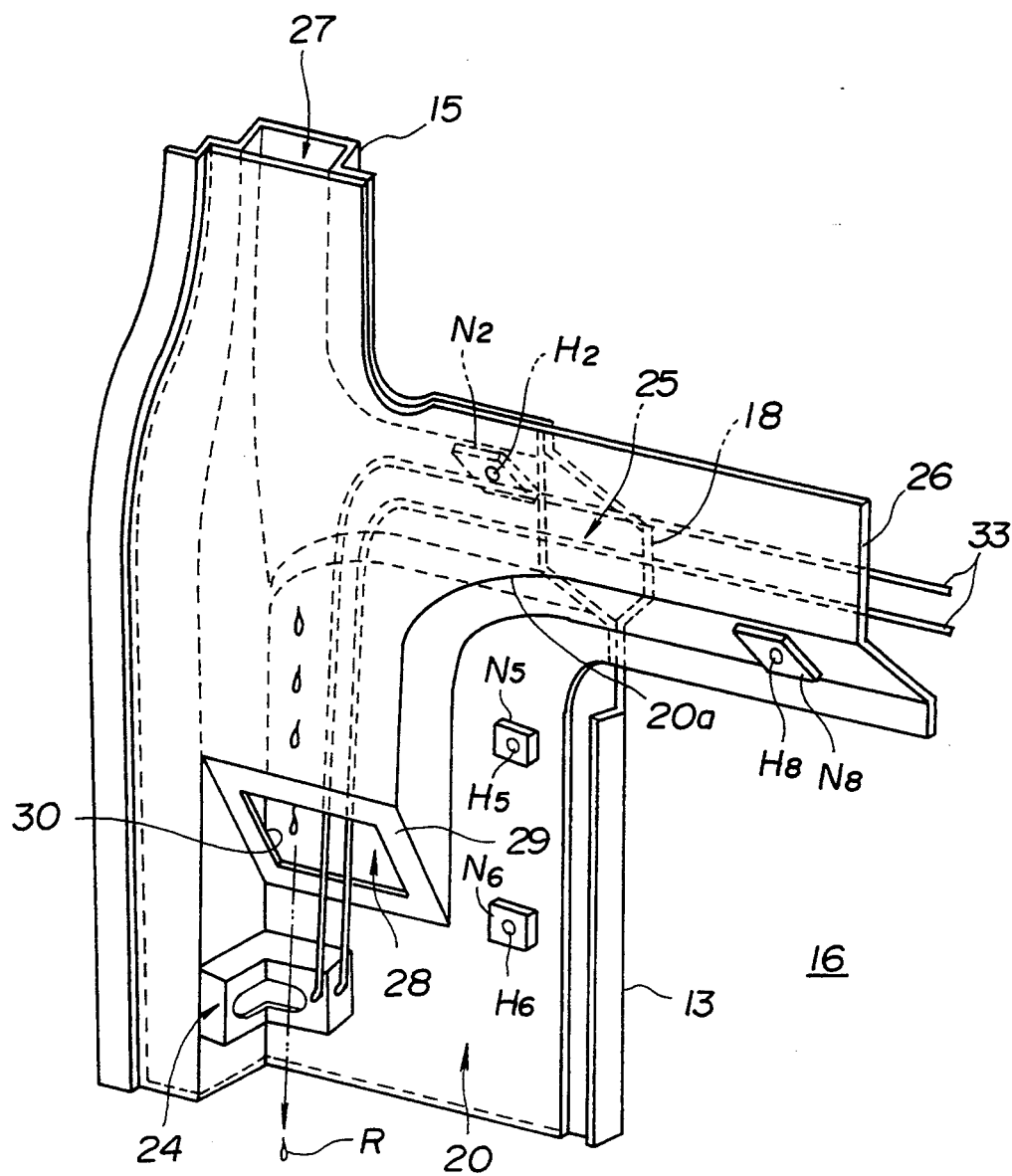
FIG. 14 is a perspective view of a part of the door structure of FIG. 11, as viewed from a direction DA shown in FIG. 11.

The rear waist bracket 20 forms a vertically extending closed hollow section 27 with the rear base portion of the sash 15, as shown in FIG. 14, and further forms a vertically extending closed hollow section 28 with the inner panel 13. The vertical closed section 27 extends upwardly above the ledge 18, and the vertical closed section 28 extends downwardly below the ledge 18. The lower end 29 of the closed section 28 is located near the door lock unit 24. These closed sections 25, 27 and 28 are continuously connected with one another. The horizontal closed section 25 opens into the continuous vertical enclosed cavity in the vertical closed sections 27 and 28. As shown in FIG. 14, the lower end 29 of the lower vertical enclosed space 28 is sloping down from an upper outboard end to a lower inboard end, and has an opening 30. Except the portion forming the enclosed section 28, the lower portion of the rear waist bracket 20 is entirely laid over, and joined with, the inner panel 13. The door lock unit 24 is fixed to this lower portion of the rear waist bracket 20. The fixing of the door lock unit 24 is made very strong and rigid by the rear waist bracket 20, and no other reinforcement (such a lock patch) is required. The door lock unit 24 is connected by a linkage 33 with an inside handle 32 which is provided in an inner frame member 31 of the regulator module 11 as shown in FIGS. 11 and 14.

The upper portion of each of the front and rear ledges 17 and 18 of the inner panel 13 is formed with a fastener hole H1 or H2 equipped with a weld nut N1 or N2 on the outboard (exterior) side. Fastener holes H3 and H4 are formed in the lower portion of the front waist bracket 19 and the portion of the inner panel 13 which are joined together, and equipped with weld nut N3 and N4 fixed to the outboard surface of the front waist bracket 19. The holes H3 and H4 are located below the ledge 17, and spaced from each other vertically. The position of the hole H3 is higher than the hole H4. Similarly, upper and lower fastener holes H5 and H6 are formed in the lower portion of the rear waist bracket 20 and the portion of the inner panel 13 which are joined together, and equipped with weld nuts N5 and N6 on the outboard side. The fastener holes H5 and H6 are arranged vertically below the ledge 18. Further fastener holes H7 and H8 are formed, respectively, in the extended portion 23 and 26 of the front and rear waist brackets 19 and 20, and equipped with weld nuts N7 and N8 on the outboard side. A ninth fastener hole H9 is formed in the middle of the lower portion of the inner panel 13, and equipped with a ninth weld nut N9 on the outboard side. The ninth hole H9 is located below the cutout portion 16 of the inner panel 13, and at the middle in the widthwise direction of the door, between the front and rear waist portions W and W'.

The regulator module 11 of this example comprises an inner frame member 31, a support plate 34, a window regulator 35 and a door window pane 14. The window regulator 35 has a wire 34 formed in a loop elongated along the vertically extending support plate 34, and a drive unit 37 for moving the wire 36 up and down. The wire 36 has a portion fixed to the lower end of the door window pane 14, so that motion is transmitted from the drive unit 37 to move the window pane 14 up and down.

The inner frame member (first or second waist member) 31 extends along the door widthwise direction. The upper boundary of the inner frame member 31 of this example is substantially flat and horizontal. However, the lower boundary of the inner frame member 31 is not flat, but shaped so that the inner frame member 31 has a lowermost portion in the middle between the front and rear ends. The inner frame member 31 has an upper end portion (center waist portion) 38 which extends along the widthwise direction of the door, and which is formed with a (center) ledge 39. The ledge 39 extends along the widthwise direction and has a cross sectional shape similar to those of the ledges 17 and 18. In the assembled state of the door, the front ledge 17, the center ledge 39 and the rear ledge 18 extend continuously along the widthwise direction.

A center waist reinforcing member (second or first waist member) 40 is joined, from the outboard side, to the upper end portion 38 of the inner frame member 31. The reinforcing member 40 extends along the upper end portion 38 in the widthwise direction, but the length of the reinforcing member 40 is smaller than the length of the upper end portion 38 of the inner frame 31. The upper end portion 38 projects beyond the reinforcing member 40 in opposite directions on the front and rear sides. The reinforcing member 40 has a cross sectional shape similar to those of the extended portions 23 and 26 of the front and rear waist brackets 19 and 20. The reinforcing members 40 and the upper end portion 38 of the inner frame member 31 are joined together and form a horizontally extending closed hollow section 41 therebetween.

Fastener holes h1 and h2 are formed, respectively, in the upper portions of the front and rear ends of the center ledge 39 of the inner frame member 31, and designed to receive bolts (fastener) F1 and F2. The holes h1 and h2 of the inner frame member 31 correspond to the holes H1 and H2 of the inner panel 13. Fastener holes h7 and h8 are formed, respectively, in the front and rear ends of the reinforcing member 40. Access holes H17 and H18 are formed in the upper portions of the front and rear end of the center ledge 39 of the inner frame member 31. The access hole H17 is located near the front fastener hole h1, and closer to the rear fastener hole h2 than the front fastener hole h1. Similarly, the rear access hole H18 is located near the rear fastener hole h2 on the front side of the fastener hole h2. The positions of the access holes H17 and H18 correspond to the fastener holes h7 and h8, which in turn correspond to the fastener holes H7 and H8. The access holes H17 and H18 are relatively large so that it is possible to pass the heads of bolts F7 and F8 through the access holes H17 and H18, to insert the shanks of the bolts F7 and F8 through the holes h7 and H7 and the holes h8 and H8, and to tighten the bolts F7 and F8 into the weld nuts N7 and N8. The inner frame member 31 is further formed with fastener holes h3–h6 below the ledge 39. The holes h3 and h4 are formed in the front end of the inner frame member 31, and correspond to the holes H3 and H4 of the front waist bracket 19 and the front portion of the inner panel 13. The holes h5 and h6 are formed in the rear end of the inner frame member 31, and correspond to the holes H5 and H6 of the rear waist bracket 20 and the rear portion of the inner panel 13. A fifth fastener hole h9 is formed in a bracket 42 which is fixed to the lower end of the support plate 34.

Figure 13:
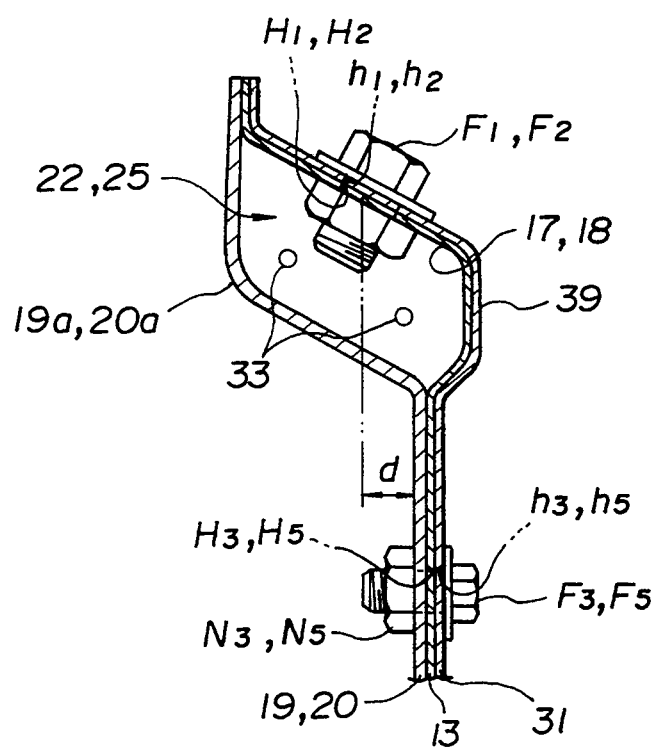
FIG. 13 is a sectional view taken along a line S13—S13 of FIG. 11.

The regulator module 11 is fixed to the outer module 10 by setting the regulator module 11 to the outer module 10 from the inboard side, aligning the holes h1–h9 of the regulator module 11 with the holes H1–H9 of the outer module 10, and screwing the bolts F1–F9 into the respective mating weld nuts N1–N9. In the second embodiment, too, the positions of the fasteners F1–F9 are distributed not only in the vertical direction and the widthwise direction of the door, but also in the thickness direction of the door. As shown in FIG. 13, the joint point of the bolts F1 or F2 (or the center of the fastener hole H1 or H2) on each of the front and rear sides is a distance d apart from the joint point of the bolts F3 or F5 (or the center of the fastener hole H3 or H5) in the thickness direction. Then, the door is finished by fastening the inner module (not shown in FIG. 11) to the subassembly of the outer and regulator modules 10 and 11.

The thus-constructed door structure has the continuous waist box beam formed by the front (first) closed section 22, the rear (second) closed section 25 and the center (third) closed section 41 which are continuously connected end to end. This waist box beam significantly increases the rigidity, such as the torsional rigidity, of the door. Furthermore, the first and second extended portions 23 and 26 overlap, and are joined to, the center closed section 41 from the outboard (exterior) side, and the inner frame member 31 (corresponding to the first waist member) has the front and rear extended portions (corresponding to third and fourth extended portions) which, respectively, overlap, and are joined to, the front and rear closed sections 22 and 25 from the inboard (interior) side. This lap joint structure increases the rigidity of the waist box beam (22, 25 and 42) extending along the waistline of the door. This waist box beam improves the safety of the vehicle by increasing the door's ability of absorbing impact energy of collision. The rigid waist box beam can eliminate the necessity of increasing the thicknesses of the outer and inner panels, and reduce the weight and manufacturing cost of the door. The rigid waist box beam can improve the accuracy in the fitting of the window pane of glass, and ensure smooth movement of the window pane.

In the example shown in FIG. 11, there are provided at least a first pair of the first bolt F1 and the first weld nut N1, a second pair of the second bolt F2 and the second weld nut N2, a third pair of the third bolt F3 or F4 and the third weld nut N3 or N4, a fourth pair of the fourth bolt F5 or F6 and the fourth weld nut N5 or N6, a fifth pair of the fifth bolt F7 and the fifth weld nut N7, and a sixth pair of the sixth bolt F8 and the sixth weld nut N8. The joint points of these bolt and nut pairs are distributed along the widthwise direction of the door, the vertical direction, and the thickness direction of the door. The bolts all extend in the imaginary plane perpendicular to the widthwise direction of the door, and they are all inserted and tightened from the inboard side. This door structure is rigid, and easy to assemble.

The door lock linkage 33 for transmitting motion from the inside handle 32 to the door lock unit 24 is arranged in the center closed section 41, the rear closed section 25, and the lower vertical closed section 28. In this example, there is formed, near the mounting portion of the inside handle 32, a hole opening into the cavity of the center closed section 41. After the fixing of the inner frame member 31, the linkage 33 extending from the inside handle 32 is inserted from this hole into the cavity of the center closed section 41, stretched in the rear closed section 25 and the lower vertical closed section 28, and taken out from the lower open end 30 to connect one end of the linkage 33 with the door lock unit 24. The closed sections 41, 25 and 28 encloses and protects the lock linkage 33 against tampering. The lower vertical closed section 28 located just above the lock unit 24 can be readily designed to protect the door lock unit 24 against rainwater R entering the interspace between the outer and inner panels 12 and 13. For examples the rainwater R flows on the surface of the closed section 28, and drops from the upper end of the opening 30 without impinging on the lock unit 24. The vertical closed section 28 can increase the anti-theft capability and decrease the possibility of freezing of the door lock.

Figure 12:
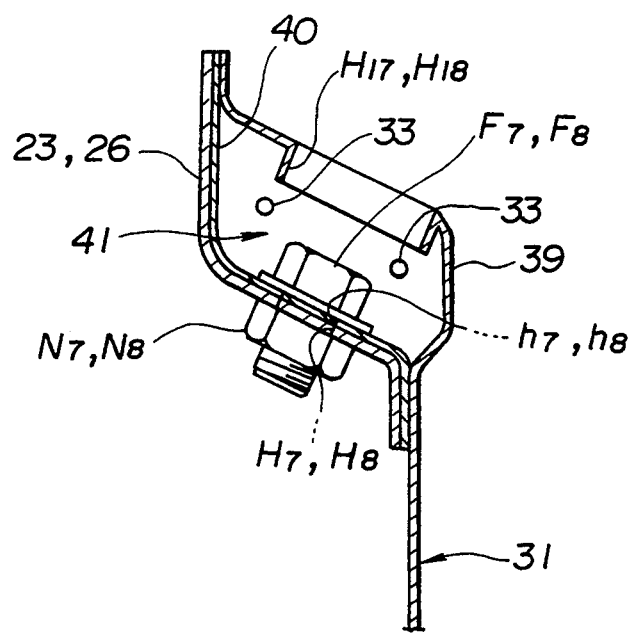
FIG. 12 is a sectional view taken along a line S12—S12 of FIG. 11.
Figure 15:
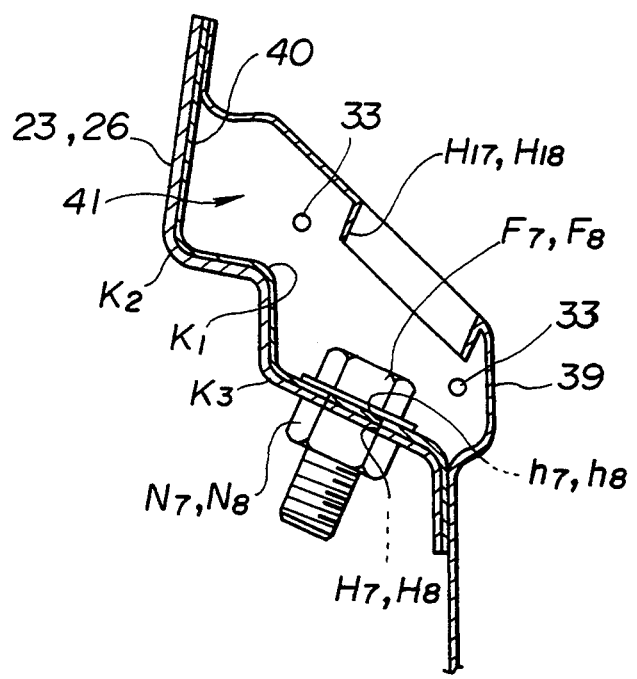
FIG. 15 is a sectional view showing a variation of a closed hollow section shown in FIG. 12.

FIG. 15 shows a variation of the center closed section 41. The closed section 41 extending in the widthwise direction of the door is formed by joining the upper portion 39 of the inner frame panel (first waist member) 31 and the reinforcing panel (second waist member) 40 at upper and lower lap joints (such as lap welds) extending in the widthwise direction. Between the upper and lower lap joints, both panels are separate to form a closed cavity therebetween as shown in FIG. 15. In the example of FIG. 15, the overlapping part of the extended portion 23 or 26 of the first or second waist bracket 19 or 20 and the reinforcing panel 40 extends from the upper lap joint to the lower lap joint, and is bent together to form an angled portion K1 projecting inwardly into the closed section 41, as shown in the sectional view of FIG. 15. The sectional shape having three angles K1, K2 and K3 as shown in FIG. 15 further increases the rigidity of the waist box beam. The upper and lower lap joints are spaced apart in the thickness direction of the door. In the case of FIGS. 12 and 13, the upper and lower lap joints are substantially vertical and parallel to each other.

Figure 16:
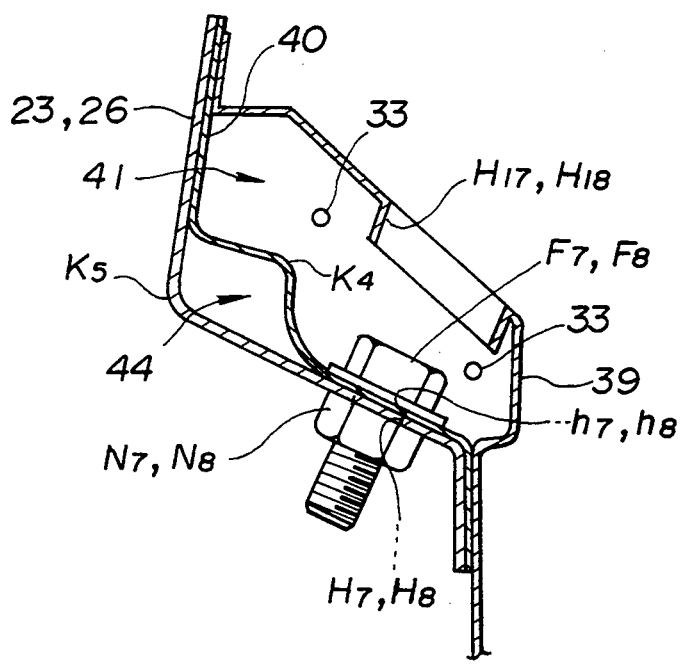
FIG. 16 is a sectional view showing another variation of the closed hollow section shown in FIG. 12.

FIG. 16 shows another variation of the center closed section 41. In this example, only the reinforce member 40 is bent inwardly to form an angle K4. Therefore, there is formed an additional closed section 44 between the angled portion K4 of the reinforce member 40 and an angled portion K5 of the extended portion 23 or 26.

Figure 17:
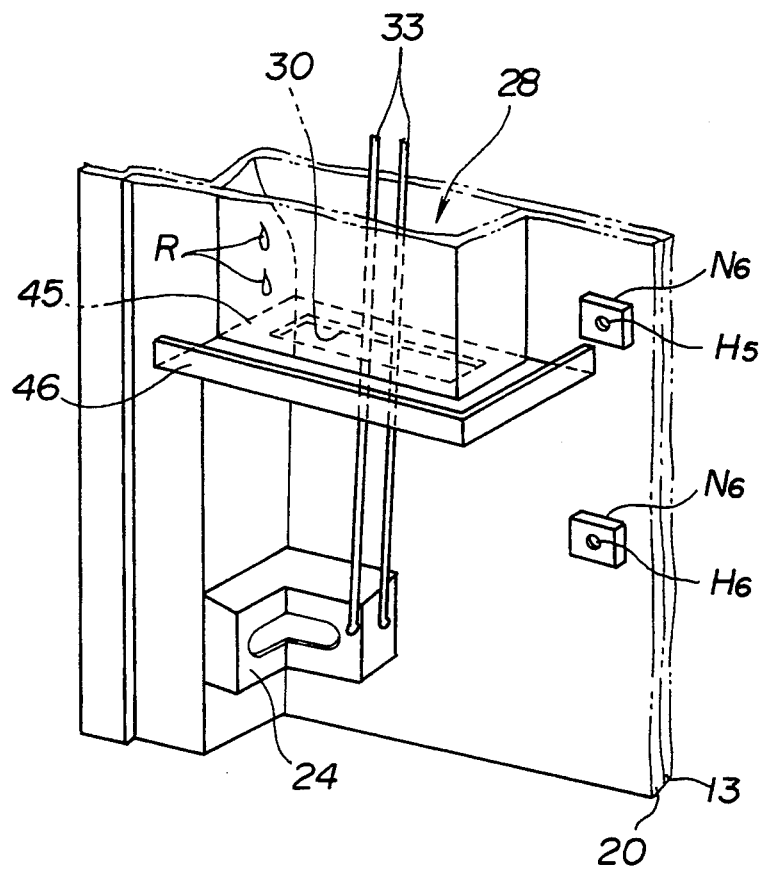
FIG. 17 is a perspective view showing a variation of a structure shown in FIG. 14.

FIG. 17 shows a variation of the lower vertical closed hollow section 28. The closed section 28 is placed just above the door lock unit 24, and formed with a lower end 45 which is flat and horizontal. The lower end 45 is fringed with a gutter 46 for receiving rainwater R and protecting the door unit 24 from the rainwater.

What is claimed is:

1. A door structure for a door of a vehicle comprising:
    an outer module comprising a basic structural member;
    a regulator module comprising a door window pane, and a regulator subassembly for moving said door window pane up and down;
    an inner module comprising an interior member forming an inside surface of said door; and
    a first joining means for joining said regulator module to said outer module, said joining means extending substantially in parallel to an imaginary plane which is parallel to a direction of a thickness of said door;
    wherein said basic structural member of said outer module comprises an inner panel, said inner panel comprising first and second upright portions each extending from a lower end to an upper portion, and a lower portion connecting said lower ends of said first and second upright portions, and wherein said regulator module further comprises a door inner waist reinforcing member comprising a first end joined to said upper portion of said first upright portion of said inner panel and a second end joined to said upper portion of said second upright portion of said inner panel;
    wherein said door inner waist reinforcing member is joined to said inner panel of said outer module by said first joining means at a plurality of joint points which are different in position along said direction of the thickness of said door.

2. A door structure according to claim 1 wherein said basic structural member of said outer module comprises a mounting portion at which said door is movably supported, and said first joining means extends in said direction of the thickness of said door.

3. A door structure according to claim 1 wherein said door structure further comprises a second joining means for joining said inner module to one of said outer module and said regulator module, and said outer module further comprises an outer panel joined to said inner panel.

4. A door structure according to claim 3 wherein said first and second upright portions of said inner panel are spaced apart from each other by a cutout portion formed in said inner panel, said cutout portion of said inner panel opening upwardly and being bounded by said first and second upright portions and said lower portion of said inner panel; wherein said upper portion of each of said first and second upright portions of said inner panel comprises a first joint portion and a second joint portion which are located at two different positions spaced from each other along said direction of the thickness of said door and along a direction of a width of said door which is perpendicular to said direction of the thickness of said door, and each of said first and second ends of said door inner waist reinforcing member comprises first and second joint portions which are located at two different positions spaced from each other along said direction of the thickness of said door; and wherein said first joining means comprises a first fastener for joining said first joint portions of said first upright portion of said inner panel and said first end of said door inner waist reinforcing member together, a second fastener for joining said second joint portions of said first upright portion of said inner panel and said first end of said door inner waist reinforcing member together, a third fastener for joining said first joint portions of said second upright portion of said inner panel and said second end of said door inner waist reinforcing member together, and a fourth fastener for joining said second joint portions of said second upright portion of said inner panel and said second end of said door inner waist reinforcing member, said fasteners extending along said direction of the thickness of said door.

5. A door structure according to claim 4 wherein said lower portion of said inner panel extends along said direction of the width of said door, and each of said first and second upright portions extends along a vertical direction of a height of said door which is perpendicular to said direction of the width of said door, and wherein each of said first and second upright portions of said inner panel is formed with a plurality of fastener holes for receiving said first joining means, said fastener holes being distributed along said vertical direction.

6. A door structure according to claim 5 wherein said door inner waist reinforcing member comprises two panels which are joined together so as to form a hollow beam.

7. A door structure according to claim 6 wherein said outer module further comprises first and second reinforcing brackets for reinforcing said first and second joint portions of said first and second upright portions of said inner panel, said first and second reinforcing brackets being joined, respectively, to said first and second upright portions of said inner panel so that a vertically extending hollow space is enclosed by each reinforcing bracket and said inner panel.

8. A door structure according to claim 7 wherein each of said first and second joint portions of said inner panel and said door inner waist reinforcing member is flat and parallel to said direction of the width of said door, each of said fastener holes is formed in one of said first and second joint portions of said inner panel, each of said fasteners of said first joining means is a screw fastener inserted through one of said fastener holes of said inner panel.

9. A door structure according to claim 8 wherein each of said screw fastener is a bolt having a head, and a shank projecting from said head toward said outer panel along said direction of the thickness of said door.

10. A door structure according to claim 9 wherein said first and second joint portions of said door inner waist reinforcing member and said inner panel are so shaped as to allow an adjustment of a relative position of said door inner waist reinforcing member with respect to said inner panel along said direction of the width of said door and along said direction of the height of said door when said bolts are loosen in said fastener holes.

11. A door structure according to claim 10 wherein said second joining means comprises clips extending along said direction of the thickness of said door.

12. A door structure according to claim 11 wherein said door structure further comprises first and second locating pins extending along said direction of the thickness of said door and positioning said inner module relative to said regulator module, each of said locating pins being fixed to one of said inner module and said regulator module, and received in a locating hole formed in the other of said inner module and said regulator module.

13. A door structure according to claim 11 wherein said regulator module further comprises a rigid rail structure for supporting said window pane and enabling said window pane to move up and down through a path which is stationary relative to said rigid rail structure; and said interior member of said inner module comprises an inside door handle portion which is fastened to said rail structure by screw fasteners.

14. A door structure according to claim 13 wherein said window pane is interposed between said outer panel and said door inner waist reinforcing member, and said outer module further comprises upper and lower hinge members fixed to said first upright portion of said inner member.

15. A door structure according to claim 7 wherein said second reinforcing bracket includes a brace comprising a vertical portion which comprises a first end joined to a first wall surface of said second upright portion of said inner panel, and a second end joined to a second wall surface of said second upright portion of said inner panel, said first and second wall surfaces extending along said direction of the height of said door, and converging to form a corner at which said first and second wall surfaces meet, said vertical portion of said brace further comprising a diagonal portion extending between said first and second ends of said brace and forming a triangular space in said corner, said brace further comprising a horizontal portion projecting from a lower end of said vertical portion of said brace.

16. A door structure according to claim 15 wherein said horizontal portion of said brace comprises a lowest flangeless edge and a flanged edge which is formed with an upward flange, and said horizontal portion of said brace is sloping down toward said lowest edge along said upward flange, and said brace further comprises an upper portion which is joined to said second upright portion of said inner panel and which closes an upper end of said triangular space, and said outer module further comprises a lock member for locking said door, said lock member being located under said brace and fixed to said second upright portion of said inner panel.

17. A door structure according to claim 7 wherein each of said first and second reinforcing brackets is located between said inner panel and said outer panel.

18. A door structure according to claim 1 wherein said door structure further comprises a second joining means for joining said inner module to a subassembly of said outer module and said regulator module, said second joining means extending in parallel to said imaginary plane which is parallel to the direction of the thickness of said door.

19. A door structure according to claim 18 wherein said second joining means includes a means for fastening said inner module to said subassembly of said outer module and said regulator module in such a manner that said inner module can be detached from said subassembly of said outer module and said regulator module without dismantling any of said modules and without removing said regulator module from said outer module, and said first joining means includes a means for fastening said regulator module to said outer module in such a manner that said regulator module can be removed from said outer module without dismantling either of said outer module and said regulator module.

20. A door structure according to claim 1 wherein said door inner waist reinforcing member, said window pane and said regulator subassembly is integrally assembled into said regulator module which is an integral unit, said regulator module being joined to said inner panel; and said interior member is joined to said regulator module.

21. A door structure according to claim 20 wherein said door structure further comprises an outer panel joined to said inner panel, and said door inner waist reinforcing member is joined to said inner panel so as to form a frame.

22. A door structure according to claim 1 wherein said outer module further comprises an outer panel which is joined to said inner panel and a brace comprising a vertical portion which is joined to one of said first and second upright portions of said inner panel so as to form a closed hollow section, and a horizontal portion projecting from a lower end of said vertical portion.

23. A door structure according to claim 22 wherein one of said first and second upright portions of said inner panel is angled to form a corner at which two vertical wall surfaces meet, said brace is joined to said inner panel to reinforce said corner.

24. A door structure according to claim 1 wherein said inner panel and said waist reinforcing member extend between the inside surface of said door and an outside surface of said door, and wherein, at each of said joint points, said waist reinforcing member is located on an inboard side of said inner panel so that said waist reinforcing member is located between said inner panel and said inside surface of said door, and said inner panel is located between said waist reinforcing member and said outside surface of said door at each joint point.

25. A door structure according to claim 24 wherein, at each joint point, an outer surface of said waist reinforcing member is in contact with an inner surface of said inner panel, said outer surface of said waist reinforcing member facing toward said outside surface of said door, and said inner surface of said inner panel facing toward said inside surface of said door.

26. A door structure according to claim 1 wherein said first upright portion of said inner panel comprises a first waist portion and extends upwardly from a lower end to said first waist portion; said second upright portion comprises a second waist portion and extends upwardly from a lower end to said second waist portion; and said waist reinforcing member extends along a direction of a width of said door and connects said first and second waist portions of said inner panel so that said waist reinforcing member, said first upright portion, said second upright portion and said lower portion of said inner panel form a frame; and wherein said joining means comprising bolts and mating nuts for fastening said waist reinforcing member to said inner panel from an interior side of said door.

27. A door structure according to claim 26 wherein each of said bolts extends along said direction of the thickness of said door.

28. A door structure according to claim 26 wherein said inner panel comprises an inner surface facing toward the interior side of said door and an outer surface facing toward an exterior side of said door; each of said first and second ends of said waist reinforcing member is joined to said inner surface of said inner panel; each of said bolts comprises a head and a shank extending outwardly from said head toward the exterior side of said door; and said nuts are all permanently fixed to said inner panel.

29. A door structure according to claim 26 wherein said door structure further comprises a first waist reinforcing bracket which is joined to said first waist portion of said inner panel to form a first closed hollow section for supporting said first end of said waist reinforcing member, and a second waist reinforcing bracket which is joined to said second waist portion of said inner panel to form a second closed hollow section for supporting said second end of said waist reinforcing member; and said waist reinforcing member comprises first and second waist members joined together to form a third closed hollow section extending in said direction of the width of said door.

30. A door structure according to claim 29 wherein each of said first closed hollow section formed by said first waist reinforcing bracket and said first waist portion of said inner panel and said second closed hollow section formed by said second waist reinforcing bracket and said second waist portion of said inner panel extends in said direction of the width of said door, and is aligned with said third closed hollow section extending between said first and second enclosed hollow sections, said first, second and third closed hollow sections are connected end to end continuously so that a continuous cavity is formed by said first, second and third enclosed sections; and wherein one of said first waist reinforcing bracket and said first waist portion of said inner panel comprises a first extended portion which overlaps said third closed hollow section and which is joined to said third closed hollow section, one of said second waist reinforcing bracket and said second waist portion of said inner panel comprises a second extended portion which overlaps said third closed hollow section and which is joined to said third closed hollow section, and said waist reinforcing member comprises a third extended portion which overlaps said first closed hollow section and which is joined to said first closed hollow section and a fourth extended portion which overlaps said second closed hollow section and which is joined to said second closed hollow section.

31. A door structure according to claim 30 wherein each of said third and fourth extended portions is an integral part of said first waist member and projects beyond said second waist member in said direction of the width of said door; said second waist member is joined to an outer surface of said first waist member; said first extended portion is an integral part of said first waist reinforcing bracket which is joined to said outer surface of said inner panel; said first extended portion of said first waist reinforcing bracket projects beyond said first waist portion of said inner panel toward said second waist portion; said second extended portion is an integral part of said second waist reinforcing bracket which is joined to said outer surface of said inner panel; and said second extended portion of said second waist reinforcing bracket projects beyond said second waist portion of said inner panel toward said first waist portion.

32. A door structure according to claim 31 wherein said second waist reinforcing bracket comprises a lower portion extending downwards; and said door structure further comprises a door lock unit fixed to said lower portion of said second waist reinforcing bracket, and a door lock linkage which is enclosed in said second and third closed hollow sections.

33. A door structure according to claim 31 wherein said second waist reinforcing bracket comprises a portion which is joined to said second waist portion of said inner panel so as to form a closed hollow section extending vertically.

34. A door structure according to claim 31 wherein said third extended portion of said first waist member is jointed with said first waist portion of said inner panel by a pair of a first bolt and a first weld nut which is welded to said outer surface of said inner panel and which is enclosed in said first enclosed hollow section, said fourth extended portion of said second waist member is jointed with said second waist portion of said inner panel by a pair of a second bolt and a second weld nut which is welded to said outer surface of said inner panel and which is enclosed in said second closed hollow section, said third extended portion of said first waist member is further joined with said first waist portion of said inner panel and said first waist reinforcing bracket by a pair of a third bolt and a third weld nut which is welded to an outer surface of said first reinforcing bracket, said fourth extended portion of said first waist member is further joined with said second waist portion of said inner panel and said second waist reinforcing bracket by a pair of a fourth bolt and a fourth weld nut which is welded to an outer surface of said second reinforcing bracket; said first extended portion of said first waist reinforcing bracket is jointed with said second waist member by a fifth bolt having a head located in said first closed hollow section and a fifth weld nut which is welded to an outer surface of said first extended portion; said second extended portion of said second waist reinforcing bracket is joined with said first waist member by a sixth bolt having a head located in said second closed hollow section and a sixth weld nut welded to and outer surface of said second extended portion, each of said first through sixth bolts being one of said bolts of said joining means, and each of said first through sixth weld nuts being one of said nuts of said joining means, a bolted joint formed by said first bolt and first weld nut being a predetermined distance apart from a bolted joint formed by said third bolt and third weld nut along said direction of the thickness of said door, a bolted joint formed by said second bolt and second weld nut being a predetermined distance apart from a bolted joint formed by said fourth bolt and fourth weld nut along said direction of the thickness of said door.

35. A door structure for a door of a vehicle, comprising:
   an outer module comprising a basic structural member;
   a regulator module comprising a door window pane, and a regulator subassembly for moving said door window pane up and down;
   an inner module comprising an interior member forming an inside surface of said door; and
   a first joining means for joining said regulator module to said outer module, said joining means extending in a direction of a thickness of said door;
   wherein said basic structural member of said outer module comprises an inner panel, said inner panel comprising first and second upright portions each extending from a lower end to an upper portion, and a lower portion connecting said lower ends of said first and second upright portions, and wherein said regulator module further comprises a door inner waist reinforcing member comprising a first end joined to said upper portion of said first upright portion of said inner panel and a second end joined to said upper portion of said second upright portion of said inner panel;
   wherein said door inner waist reinforcing member is joined to said inner panel of said outer module by said first joining means at a plurality of joint points which are distributed along said direction of the thickness of said door.

* * * * *

UNITED STATES PATENT AND TRADEMARK OFFICE
CERTIFICATE OF CORRECTION

PATENT NO. : 5,355,629
DATED : October 18, 1994
INVENTOR(S) : Kouichi KIMURA et al It is certified that error appears in the above-indentified patent and that said Letters Patent is hereby corrected as shown below:

Please correct the above-identified patent as follows:

On the title page, please delete item [75] and insert the following therefor:

--[75] Inventors: Kouichi Kimura, Yokohama; Kenichi Hirooka, Ebina; Hiroshi Tsuchiya, Zama; Akito Tozuka, Fujisawa; Shuji Yamagata; Kiyoto Matsuzaki, both of Yokohama; Kensuke Uchida, Tokyo; Toshiaki Shiraiwa; Sumio Inami, both of Atsugi; Eiji Murakami, Sagamihara; Tetsuji Nasu, Yokohama; Takayuki Sano, Zama, all of Japan--.

Signed and Sealed this

Seventh Day of February, 1995

Attest:

BRUCE LEHMAN

Attesting Officer  Commissioner of Patents and Trademarks